Aug. 25, 1964     R. H. FAIRBANK ETAL     3,145,584
VARIABLE SPEED REVERSIBLE TRANSMISSION
Filed Jan. 26, 1962                              2 Sheets-Sheet 1

INVENTORS
R. H. FAIRBANK
Y. O. CARLSON

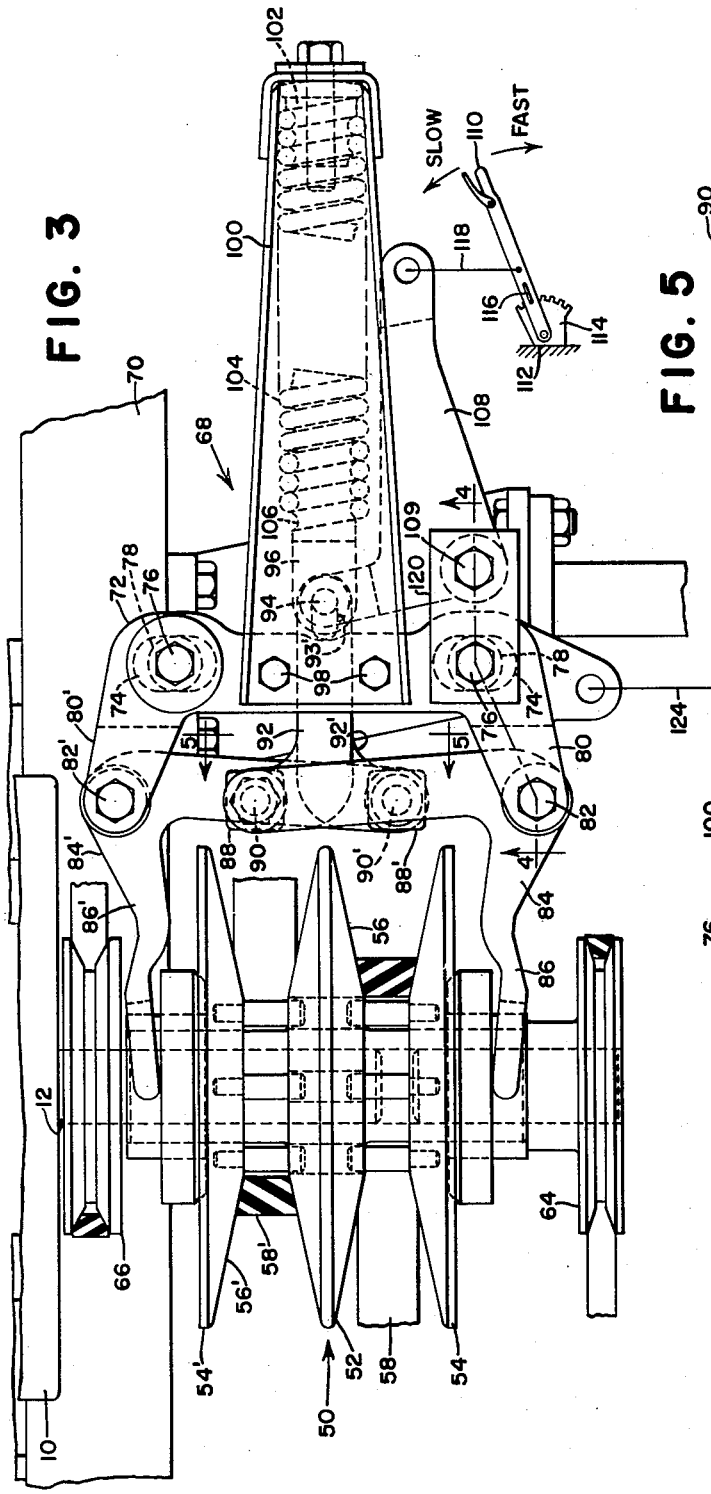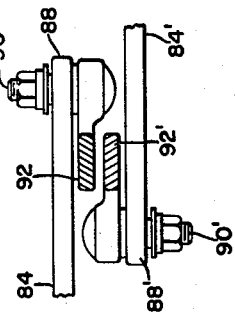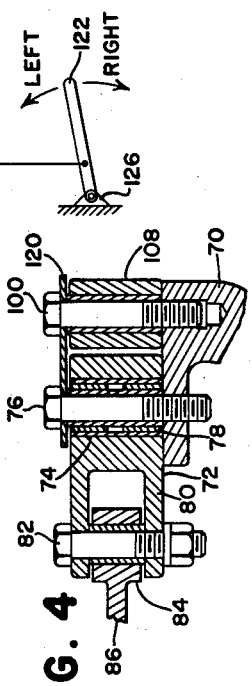

United States Patent Office 3,145,584
Patented Aug. 25, 1964

3,145,584
VARIABLE SPEED REVERSIBLE TRANSMISSION
Raymond H. Fairbank, Moline, and Yngve O. Carlson, East Moline, Ill., assignors to Deere & Company, Moline, Ill., a corporation of Delaware
Filed Jan. 26, 1962, Ser. No. 168,971
7 Claims. (Cl. 74—722)

This application is a continuation-in-part of Serial No. 144,465, filed October 11, 1961.

This invention relates to a transmission especially adapted for use in light-weight vehicles that require considerable maneuverability in the operation thereof. Typical of such machines is that known as the self-propelled windrower, a common example of which comprises a fore and aft frame having a pair of traction wheels at its front end and a caster wheel at its rear end, the principle of operation being that the traction wheel speeds and directions are varied to accomplish changes in speed, direction and steering.

It is also common in vehicles of this general character to employ variable-speed sheave arrangements, including shiftable idlers for transferring the drive from forward to reverse driven members, or in some cases employing double belts at each side, one of which is a forward belt and the other of which is a reverse belt, in conjunction with appropriate idlers. Such arrangement, in association with the variable-speed characteristics of the sheave arrangement provide what may be regarded as a relatively flexible and low-cost drive.

However, these arrangements leave much to be desired in the control systems and there is also room for improvement in the flexibility of the drive to the extent that the various contol possibilities can be made to exist in reverse as well as in forward direction of travel. Accordingly, it is the principal object of the present invention to provide an improved over-all drive arrangement of the general character referred to. More specifically, it is an object of the invention to provide the input for both sides of such vehicle with a variable-speed sheave unit which is capable of four-way adjustment; that is to say, the sheave unit may be adjusted to vary both sides directly and in like manner to vary speeds for straight-ahead or straight-reverse travel; in addition, the sheaves may be reversely adjusted to vary the speeds inversely so as to accomplish steering. It is another feature of the invention to provide such variable-speed sheave unit in conjunction with reversible drive means at opposite sides of the vehicle so that the four-way adjustment of the variable-speed sheave unit is available irrespective of the direction of travel of the machine. Still another object is to provide improved control means for the variable-speed unit.

The foregoing and other important objects and desirable features inherent in and encompassed by the invention will become apparent as a preferred embodiment thereof is disclosed in detail in the ensuing description of a preferred embodiment, taken in conjunction with the accompanying sheets of drawings, the figures of which are described below.

FIG. 3 is an enlarged plan, with portions in section, of the variable-speed sheave unit and the associated control unit.

FIG. 4 is a section on the line 4—4 of FIG. 3.

FIG. 5 is a section on the line 5—5 of FIG. 3.

Figure 1:
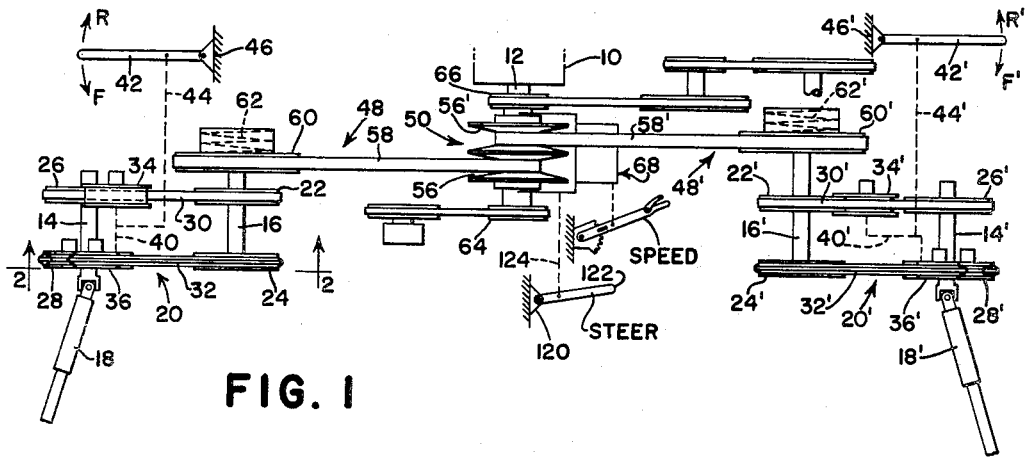
FIG. 1 is a schematic illustration of the over-all drive.

Reference will be had first to FIG. 1 for a general orientation of the subject matter. In this view, the drive is arranged, for example, on a vehicle adapted to travel forwardly in a direction that is downwardly on the sheet. Such vehicle will be equipped with a main frame (not shown) on which is carried a suitable source of power, such as an internal combustion engine, represented here at 10. This engine has a drive or input shaft 12 projecting forwardly therefrom. Since FIG. 1 is oriented as above said the right and left hand sides of the machine appear respectively at the left and right hand sides of the sheet. The right hand side of the drive includes a right hand or first driven or output shaft 14 and a right hand or second countershaft 16, these preferably being arranged in parallel relationship as shown. Equidistantly spaced at the opposite side of the input shaft 12 are left hand or second output and countershafts 14' and 16'. The output or driven shafts 14 and 14' may be suitably connected in any appropriate manner to traction wheels (not shown) as by forwardly projecting telescopic propeller shafts 18 and 18', respectively.

The countershaft 16 and output shaft 14 are interconnected by right hand forward-reverse drive means 20, and left hand drive means 20' are provided between the left hand countershaft and output shaft 16' and 14'. In the case of the means 20, the countershaft 16 has fixed thereto a forward sheave 22 and a reverse sheave 24. Coaxially spaced apart forward and reverse driven sheaves 26 and 28 are fixed to the output shaft 14 respectively in alinement with the sheaves 22 and 24 so as to respectively receive the forward and reverse belts 30 and 32. In addition to being trained about the forward sheaves 22 and 26, the belt 30 is also associated with an idler 34, and a pair of idlers 36 and 38 are used with the reverse belt 32.

Figure 2:
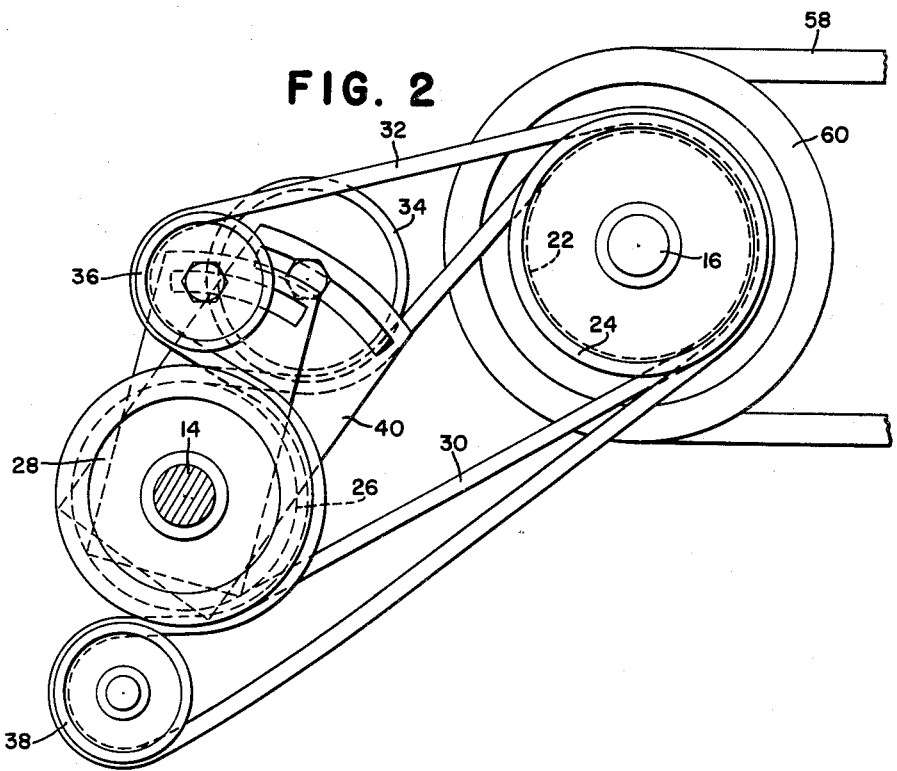
FIG. 2 is an enlarged view of one portion of the drive as seen generally along the line 2—2 of FIG. 1.

As best seen in FIG. 2, the belt 30 is trained about the two sheaves 22 and 26 and the idler 34 acts on that stretch or run of the belt between these two sheaves. In the case of the reverse belt 32, it is trained in such manner about the idlers 36 and 38 that it has a reverse wrap about the reverse outpt sheave 28, with the result that although the countershaft 16 rotates constantly in a counterclockwise direction, the belt 30 is capable of driving the output shaft 14 in the same direction but the belt 32 is capable of driving the output shaft 14 in the opposite direction. This is accomplished by proper mounting and controlling of the idlers 34 and 36, which as seen in FIG. 2 are or may be mounted on a common bracket 40. The bracket 40 is swingable about the axis of the output shaft 14. The arrangement in this respect is largely immaterial, since many other types of mountings and controls could be used. Therefore, considering the bracket 40 as representative of a common mounting for the idlers 34 and 36, it will be seen that swinging of the bracket 40 in one direction or the other causes tightening of one belt while loosening the other. That is to say, both belts obviously cannot be tightened at the same time. Hence, if the bracket 40 is swung in a clockwise direction as seen in FIG. 2, it will tighten the forward belt 30 and establish forward drive, while the reverse belt 32 merely idles. Conversely, if the bracket 40 is swung in a counterclockwise direction, it will tighten the belt 32 via the idler 36 and therefore the output shaft 14 will rotate in a direction opposite to that of the countershaft 16, and the forward belt 32 will simply idle. Shown schematically in FIG. 1 is a right hand direction lever 42 which may be connected by a link 44 to the bracket 40. The lever 42 may be pivotally mounted on any suitable portion of support means, as at 46. In the schematic example shown, swinging of the lever in one direction will establish reverse drive and swinging of the lever in the opposite direction will establish forward drive. These positions are indicated by the letters R and F on the drawing.

The drive and control arrangement is duplicated at 20' at the left hand side of the machine, with certain exceptions to be hereinafter noted. Thus, the countershaft 16' has keyed thereto a pair of sheaves 22' and 24' which, through belts 30' and 32', drive sheaves 26' and 28', respectively, keyed to the left hand output shaft 14'. Forward and reverse shiftable or control idlers 34' and 36', respectively, are associated with the belts 30' and 32'. However, in this case, the forward control idler 34' acts on a lower run of the left hand belt 30' so that it is swingable upwardly to tighten that belt and downwardly to loosen that belt. Conversely, the idlers 34' and 36' are interconnected by a bracket 40' so that as one idler is moved to tighten its belt, the other idler moves to loosen its belt. The mounting bracket 40' is shown schematically only, but it will be understood that it is similar to that shown at 40 in FIG. 2. A left hand direction control lever 42' is connected by a link 44' to the bracket 40', being suitably mounted at 46' for swinging in opposite directions to establish reverse and forward drive, which positions are again indicated by the letters R' and F'.

From the description thus far, it will be seen that if a drive is established from the engine or input shaft 12 to the countershafts 16 and 16', to rotate these countershafts continuously in the same direction, the output shafts 14 and 14' may be selectively driven in forward or reverse by controlling the respective idler assemblies 34–36 and 34'–36', all of which may be achieved by the two control levers 42 and 42'. It will further be appreciated that one drive means 20, 20' may be driven forwardly while the other is driven reversely, and if this principle is adapted to a vehicle of the character referred to above, such vehicle will be capable of executing a "spin" or sharp turn to the side which is driven reversely. Obviously, selective control of the drive means 20 and 20' will give the ability to steer in such manner in either direction. The idler assemblies 34–36 and 34'–36' may also be arranged to include a neutral position, so that one side of the machine may be driven while the other is idle, thus producing gradual turns. These two types of turns will of course be available in both directions. Hence, a machine so equipped becomes relatively maneuverable, which is an important requirement in the field of self-propelled windrowers, for example, where square corners are required in the harvesting of grain and the like.

It will be further appreciated that if the speeds of the countershafts 16 and 16' are variable, then the directional speeds of the vehicle will be variable. According to the present invention, right and left hand variable speed drives 48 and 48', respectively, are provided for this purpose. These two drives are commonly connected to the input or drive shaft 12 by a compound variable-speed sheave unit 50 which here includes an axially fixed center section 52 and relatively axially shiftable outer or side sections 54 and 54'. The section 54 and the proximate side of the center section 52 are common to the right hand variable-speed drive 48 and combine to afford a variable-diameter belt groove 56 for receiving a right hand drive belt 58, which is trained also about a variable speed sheave 60 keyed to the right hand countershaft 16. The sheave 60 is of the type that is spring loaded, as at 62, to accommodate changes in its belt groove when changes are effected in the belt groove 56 of the unit 50. Sheaves of this type are of course well known to those versed in the art and further elaboration is deemed to be unnecessary.

The sheave 54' and the other half of the center section 52 afford a left hand drive belt groove 56' which is capable of being varied as to diameter. A left hand drive belt 58' is received in the groove 56' and is further trained about a left hand variable speed sheave 60' that is keyed to the left hand countershaft 16'. This sheave, like the sheave 60, is spring loaded, as at 62', for the same purposes.

The belts 58 and 58' may be typical well known V belts, which is true also of the belts 30 and 30'. Because of the employment of outer run portions in the reverse belts 32 and 32', these are preferably of hexagonal section, a belt-type that is not unknown.

The sheave unit 50 is mounted on the shaft 12 in any suitable manner so as to rotate therewith, it being clear, as already stated, that the center section 52 is fixed against axial shifting while the other sections 54 and 54' are shiftable axially, relative to each other as well as relative to the center section 52. The means by which the sheave sections 52, 54 and 54' are interconnected for rotation together while permitting the relative axial movement are believed to be shown clearly enough without further description.

In addition to the sheave unit 50, the shaft 12 has keyed thereto output sheaves 64 and 66 for driving other components on the vehicle. Since these play no part in the variable-speed drive of the output shafts 14 and 14', further reference thereto will not be had.

Since the sheave sections 54 and 54' are shiftable relative to the fixed center section 52, it follows that four-way control thereof is available. Thus, the sheave sections 54 and 54' may be shifted simultaneously in opposite directions toward the center section 52 from the position shown in FIG. 3 so as to simultaneously increase the diameters of the belt grooves 56 and 56', thus simultaneously increasing the speeds of the right and left hand countershafts 16 and 16'. Secondly, these two sheave sections may be moved oppositely axially away from the center section 52 so as to decrease the belt groove diameters at 56 and 56', thus decreasing simultaneously and in like manner the speeds of the countershafts 16 and 16'. It will be understood, of course, that as the diameters of the belt grooves change at 56 and 56', the spring loads at 62 and 62' will accommodate changes in the belt groove diameters in the countershaft sheaves 60 and 60'.

In a third phase of the four-way adjustment unit 50, the sheave sections 54 and 54' may be shifted simultaneously in the same direction so that the sheave section 54 moves toward the center section 52 while the sheave section 54' moves simultaneously away from the center section 52. Consequently, the belt groove 56 will become increased in diameter and that at 56' will be decreased. If the two sheave sections 54 and 54' are moved simultaneously and uniformly, the speed change will be inverse, consequently increasing the speed of the right hand countershaft 16 while simultaneously and inversely decreasing the speed of the left hand countershaft 16'. The fourth phase is the reverse of that described; that is, the sheave section 54' moves toward the sheave section 52 while the section 54 moves away from the section 52, thus inversely varying the belt groove diameters at 56' and 56 so as to increase the speed of the left hand countershaft 16' while decreasing the speed of the right hand countershaft 16.

For the purpose of providing the four-way adjustment of the sheave unit 50, the drive is equipped with a control unit designated in its entirety by the numeral 68. This is best shown in FIG. 3 as being mounted on suitable support means 70 to which the mounts 46 and 46' may be connected or of which said mounts may form a part, it being understood that all of this may exist as part of the main frame (not shown completely) of the vehicle. The control unit and its general relationship to the sheave unit 50 are illustrated schematically in FIG. 1.

The control unit includes a carrier or support 72 which is disposed adjacently to the sheave unit 50 and which is mounted on a portion of the support 70 for shifting back and forth along a line parallel to the axis of the shaft 12. For the purpose of effecting this mounting, the carrier 72 is provided with a pair of slots 74 which are elongated along the line just mentioned. A pair of cap screws 76 are passed respectively through cylindrical bushings 78 and threaded into the support 70 (FIG. 4) to mount the carrier. Thus, the carrier has shifting movement within the limits by which the length of the slots exceeds the diameters of the bushings 78. At the same time, the carrier is held against displacement axially of the cap screws 76.

The carrier is provided with bracket portions 80 and 80' which are spaced apart lengthwise of the path of shifting of the carrier and which further project respectively toward the sheave unit sections 54 and 54', and these bracket portions are provided respectively with pivots 82 and 82' for respectively pivotally mounting right and left hand control levers or bell cranks 84 and 84'. The bell crank 84 has an arm in the form of a yoke 86 which is connected to or engages the right hand shiftable sheave section 54, which connection may be established in any suitable manner. A similar yoke or arm 86' on the other bell crank 84' has a similar connection with the left hand shiftable sheave section 54'.

The bell cranks 84 and 84' respectively have second arms 88 and 88' which extend oppositely toward each other in overlapping relation (FIG. 5) so that their terminal end portions lie intermediate the bracket portions 80 and 80'. In this area, the overlapped ends of the arms 88 and 88' are respectively pivotally connected at 90 and 90' to link means comprising a pair of links 92 and 92'. Each link is generally of L shape so that it curves laterally outwardly for connection to its associated bell crank arm, and the longer parts of the links are connected in common at 94 to a clevis 96.

Rigidly secured to the carrier 72, as by a pair of cap screws 98, is an elongated support 100, which extends away from the unit 50 in a direction normal to the line of movement of the carrier 72 on its bushings 78. The remote end of this bracket has therein a spring connector 102 which receives one end of a tension spring 104, and the other end of this spring is connected at 106 to the clevis 96. Thus, the spring 104 acts in tension to exert a force through the links 92 and 92' on the bell cranks 84 and 84' such as to cause these bell cranks to turn in opposite directions so that the sheave sections 54 and 54' are biased toward the center section 52. In other words, the bias is such that the tendency is for the control unit to simultaneously and uniformly increase the diameters of the variable-speed belt grooves 56 and 56'.

A control lever in the form of a bell crank 108 is pivotally mounted on the support means 70 by a cap screw 109 which establishes a pivot on an axis parallel to the axes at 82 and 82'. One arm of the control bell crank 108 is commonly connected to the clevis 96 and links 92 and 92' by the connection 94. In the posture of the structure shown in FIG. 3, the tendency of the spring 104 is to urge the control bell crank 108 in a clockwise direction about its pivot 109. Any suitable speed-control means may be utilized for regulating the lever 108. Shown schematically in FIG. 3 is a speed lever 110 pivotally mounted at 112 on what may be a part of the support means 70, to swing back and forth over a control sector 114 which is notched for cooperation with a detent 116 on the lever. The lever is linked at 118 to the control bell crank 108. When the lever 110 is locked to the sector 114, the spring tension is of course resisted and any speed setting of the sheave unit 50 will be maintained until the position of the lever 110 is changed. In an actual structure the linkage at 118 is of course strong enough to overcome the tension in the spring 104 when the operator desires to move the lever 110 between its slow and fast positions (which are marked on the drawing).

At this point, it should be observed that the forces developed by the spring 104 and the rocking of the control bell crank 108 are primarily normal to the line of shifting movement of the carrier 72. Moreover, the forces developed by opposite movement of the bell cranks 84 and 84' are opposed. Hence, while the control bell crank 108 is operative to shift the positions of the sheave unit sections 54 and 54' oppositely toward or oppositely away from the fixed center section 52, the carrier 72 remains essentially stationary and the speed changes are uniform and direct. Therefore, if the forward-reverse drive means 20 and 20' are set for straight-ahead travel, for example, the straight-ahead travel will be maintained at varying speeds according to the adjustment of the speed control lever 110. The same is true, of course, if the forward-reverse drive means 20 and 20' are simultaneously set for reverse travel. In other words, the control of the speed lever 110, without more, is not expected to have any effects on steering of the vehicle.

However, steering can be accomplished by shifting the carrier 72 bodily so as to obtain the inverse speed changes in the belt grooves 56 and 56', which involves shifting of the sheave sections 54 and 54' in their third and fourth phases. As previously outlined, when the sheave sections 54 and 54' are shifted simultaneously but in the same direction, one moves closer to and the other farther from the center section 52. In the present case, this is accomplished by shifting of the carrier 72 which carries with it both yokes 84 and 84', and this is available even though the control bell crank 108 is pivoted to the support while the carrier 72 is shiftable on the support. A tie strap 120 which spans the cap screws 76 and 109 is simply for additional support of the cap screw 109 and has no effect on the manipulative relationship between the bell crank 108 and the shifting carrier 72. However, since the connections among the control bell crank 108, links 92 and 92' and bell cranks 84 and 84' are pivotal at 94, 90 and 90', the bodily shifting movement of the carrier 72 is available to accomplish shifting of the sheave sections 54 and 54' selectively oppositely but in each case in the same direction.

In the position of the sheave section 54 and 54' shown in FIG. 3, both belt grooves 56 and 56' are at their respective smallest diameters. If the carrier 72 is shifted rearwardly, which is upwardly on the sheet, the tendency is to shift the section 54 toward the section 52 and simultaneously to shift the section 54' away from the section 52. However, the section 54' is as far away from the section 52 as it can go. Nevertheless, as the pivot point 82' moves farther rearwardly, it causes the bell crank 84' to rock in a counterclockwise direction, since the arm 84' is engaged with the sheave section 54'. Hence, the pivot point 90' moves toward the pivot 94 as well as rearwardly. The spring 104 of course has no effect at this time, because it is locked by the mechanism 114–116. Therefore, the pivot 94 is fixed. But the link 92' has a slot 93' therein which accommodates this situation. However, the other bell crank 84 is carried along with the carrier because as its pivot 82 moves rearwardly, its pivotal connection at 90 to the link 92 also moves rearwardly, which is opposed by the resistance of the sheave section 54 against the arm 86, and the link 92 is placed in tension, swinging about the pivot 94. Thus, the section 54 can approach the section 52 even though the section 54' cannot move away from the section 52. The result is that the belt groove diameter at 56 will be increased while that at 56' remains essentially constant. The same is true if the carrier 72 is shifted forwardly, except in reverse order; that is, the belt groove 56' will increase in diameter while the belt groove 56 remains essentially constant, it being understood that the link 92 has a slot corresponding to that at 93' in the link 92'. This is simply the low-speed situation in which inverse variations in speed are not likely to be desired. It is when the two sheave sections 54 and 54' are in an intermediate status that the inverse variations in speed become important. Hence, considering each of the sections 54 and 54' as being moved simultaneously toward the section 52, by the speed control lever 110, so as to occupy intermediate positions in which the belt grooves 56 and 56' are of the same diameter, it will be seen that uniform but inverse speed variations are accomplished by shifting the carrier 72 which will control the sheave sections 54 and 54' as aforesaid.

Any suitable control means may be utilized to shift the carrier. That shown schematically here involves a steering lever 122 linked to the carrier at 124 and pivotally mounted at 126 on what may be part of the support means 70. This type of control, like those at 42, 42' and 110, are merely representative. Various other types of control could be used. In a typical machine, it is expected that these would all be grouped conveniently to an operator of the machine. In other instances, certain of these controls could be tied together in any suitable manner, all without the exercise of invention.

It will be seen from the foregoing that with the speed control lever 110 set in its "slow" position, the right and left variable-speed belt groove diameters 56 and 56' are the same and consequently the two countershafts 16 and 16' will be driven in the same direction and at the same speed. If both direction control levers 42 and 42' are moved to their forward positions, the machine will travel forwardly at the speed dictated by that set in the variable-speed unit 50. If these two levers are moved simultaneously to their reverse positions, the machine will travel backwardly at the same speed. If one lever 42 or 42' is moved to its forward position and the other is moved to its reverse position, then the machine will steer to the side which is placed in reverse, as by having reverse idler 36, 36' engaged with its belt while having its forward idler 34, 34' engaged with its associated belt.

Again, with both levers 42 and 42' set in the same directional position, speed variations may be accomplished in the unit 50 by changes in position of the speed lever 110. This will of course involve simultaneous and like speed changes in the countershafts 16 and 16' and this is applicable whether the machine is traveling forwardly or reversely. Again, at any of the increased or decreased speeds, steering may be accomplished by appropriate control of the direction levers 42 and 42' so as to drive one side of the machine forwardly and the other side reversely, thereby obtaining "spin" turns.

What may be regarded as precision steering may be achieved by control of the steering lever 122, which is accomplished by setting both direction levers 42, 42' in the same direction, for example forwardly. Then, when the steering lever 122 is moved to shift the carrier 72 bodily, for example, forwardly, the sheave section 54' will move toward and the sheave section 54 will move away from the section 52, thus increasing the belt diameter at 56' while inversely decreasing the belt groove diameter at 56, thus speeding up the left hand countershaft 16' and simultaneously proportionately slowing down the right hand countershaft 16, achieving thereby a gradual turn to the right. A turn to the left is accomplished by swinging the control lever 122 to the rear.

One of the features of the invention resides in arranging the variable-speed unit 50 in the drive line "upstream" of the countershaft 16 and 16'. This means that the countershafts will always rotate in the same direction and at speeds, like or inverse, as determined by the unit 50. Moreover, it is more convenient from the design standpoint to utilize the sheave unit 50 on the constantly driven uni-directionally rotating input shaft 12 than on the variously driven countershafts 16 and 16', primarily because these must be utilized for the purpose of accommodating the belts 30-32 and 30'-32' of the right and left hand forward-reverse units 20 and 20'. Moreover, the disposition of the sheave unit 50 as aforesaid increases the flexibility of the drive since uniform and inverse speed variations are available irrespective of the direction of travel of the machine. By proper manipulation of the controls, it is possible to achieve a wide variety of steering and drive situations.

The control unit 68 is simply constructed and easy to operate and service. Being located in close proximity to the sheave 50, the over-all compactness of the construction is improved and the forces required to operate the sheave unit are minimized to the extent that simple levers can be used as distinguished from more complicated mechanism.

Features and advantages other than those enumerated will readily occur to those versed in the art, as will many modifications and alterations in the preferred embodiment of the invention disclosed, all of which may be achieved without departure from the spirit and scope of the invention.

What is claimed is:

1. A variable-speed reversible transmission, comprising: an input shaft; first and second countershafts parallel to and spaced respectively to opposite sides of the input shaft; first and second output shafts respectively adjacent to and paralleling the first and second countershafts; first forward-reverse drive means interconnecting the first countershaft and first output shaft; second forward-reverse drive means interconnecting the second countershaft and second output shaft; first and second variable-speed drive means respectively independent of the two forward-reverse drive means and connecting the input shaft respectively to the first and second countershafts and including first and second similar variable-speed sheaves coaxially connected to and driven by the input shaft, first and second countershaft sheaves respectively coaxially fixed to the first and second countershafts, and first and second belts trained respectively about the input shaft and countershaft sheaves; a single first control means connected to and for simultaneously and similarly adjusting the input shaft sheaves irrespective of the status of the two forward-reverse drive means so as to cause like variations in the speeds of the countershafts; and a single second control means connected to and for simultaneously and reversely adjusting the input shaft sheaves irespective of the status of the two forward-reverse drive means so as to inversely vary the speeds of the countershafts.

2. A variable-speed reversible transmission, comprising: an input shaft; first and second countershafts parallel to the input shaft; first and second output shafts respectively adjacent to the first and second countershafts; first forward-reverse drive means interconnecting the first countershaft and first output shaft; second forward-reverse drive means interconnecting the second countershaft and second output shaft; first and second variable-speed drive means respectively independent of the two forward-reverse drive means and connecting the input shaft respectively to the first and second countershafts and including first and second similar variable-speed sheaves coaxially connected to and driven by the input shaft, first and second countershaft sheaves respectively coaxially fixed to the first and second countershafts, and first and second belts trained respectively about the input shaft and countershaft sheaves; a single first control means connected to and for simultaneously and similarly adjusting the input shaft sheaves irrespective of the status of the two forward-reverse drive means so as to cause like variations in the speeds of the countershafts; and a single second control means connected to and for simultaneously and reversely adjusting the input shaft sheaves irrespective of the status of the two forward-reverse drive means so as to inversely vary the speeds of the countershafts.

3. Variable-speed sheave means and control therefor, comprising: support means; a shaft journaled on said support means; a variable-speed sheave unit coaxially connected to and rotatable with the shaft and including an axially fixed center section and a pair of relatively axially shiftable outer sections respectively flanking the center section to afford a pair of variable-diameter belt grooves; a carrier mounted on the support means adjacent to the unit for shifting back and forth along a line parallel to the shaft; a pair of bell cranks pivoted to the carrier on parallel axes and respectively having first arms connected respectively to and for axially shifting the outer sheave unit sections and further respectively having second arms; first control means movably mounted on the support means and operatively connected to the second arms for rocking the bell cranks while the carrier remains stationary so as to shift said outer sections selectively simultaneously toward or simultaneously away from the center section so as to vary the diameters of both belt groves alike; and second control means for shifting the carrier selectively back and forth along with the bell cranks to cause the outer sections to shift simultaneously in the same direction whereby to inversely vary the diameters of the belt grooves.

4. Variable-speed sheave means and control therefor, comprising: support means; a shaft journaled on said support means; a variable-speed sheave unit coaxially connected to and rotatable with the shaft and including an axially fixed center section and a pair of relatively axially shiftable outer sections respectively flanking the center section to afford a pair of variable-diameter belt grooves; a carrier mounted on the support means adjacent to the unit for shifting back and forth along a line parallel to the shaft and having a pair of bracket portions extending respectively into proximity to said outer sections; a pair of bell cranks pivoted respectively to said bracket portions on parallel axes and respectively having first arms extending toward and respectively engaging the outer sections and further respectively having second arms extending toward each other and intermediate said bracket portions; a control lever pivoted to the support means adjacent to one bracket portion and having a lever arm extending to a point intermediate said bracket portions and spaced from said bell crank second arms along a line normal to the line of movement of the carrier; link means pivotally interconnecting the lever arm and the bell crank second arms so that rocking of the lever selectively in opposite directions acts through the link to rock the bell cranks while the carrier remains stationary so as to shift said outer sections selectively simultaneously toward or simultaneously away from the center section so as to vary the diameters of both belt grooves alike; and second means for shifting the carrier selectively back and forth along with the bell cranks to cause the outer sections to shift simultaneously in the same direction whereby to inversely vary the diameters of the belt grooves.

5. The invention defined in claim 4 including: biasing means acting on the link means and reacting on the carrier to urge the bell cranks to rock in such direction as to increase the diameters of both belt grooves.

6. Variable-speed sheave means and control therefor, comprising: support means; a shaft journaled on said support means; a variable-speed sheave unit coaxially connected to and rotatable with the shaft and including an axially fixed center section and a pair of relatively axially shiftable outer sections respectively flanking the center section to afford a pair of variable-diameter belt grooves; a carrier mounted on the support means adjacent to the unit for shifting back and forth along a line parallel to the shaft and having a pair of bracket portions extending respectively into proximity to said outer sections; a pair of bell cranks pivoted respectively to said bracket portions on parallel axes and respectively having first arms extending toward and respectively engaging the outer sections and further respectively having second arms extending toward each other and intermediate said bracket portions; a control lever pivoted to the support means adjacent to one bracket portion and having a lever arm extending to a point intermediate said bracket portions for movement along a line normal to the line of movement of the carrier; means pivotally interconnecting the lever arm and the bell crank second arms so that rocking of the lever selectively in opposite directions acts to rock the bell cranks while the carrier remains stationary so as to shift said outer sections selectively simultaneously toward or simultaneously away from the center section so as to vary the diameters of both belt grooves alike; and second means for shifting the carrier selectively back and forth along with the bell cranks to cause the outer sections to shift simultaneously in the same direction whereby to inversely vary the diameters of the belt grooves.

7. The invention defined in claim 6 including: biasing means acting on the bell cranks and reacting on the carrier to urge the bell cranks to rock in such direction as to increase the diameters of both belt grooves.

References Cited in the file of this patent

UNITED STATES PATENTS

| | | |
|---|---|---|
| 2,754,691 | May | July 17, 1956 |
| 2,799,175 | Peck | July 16, 1957 |
| 2,882,753 | Pakosh | Apr. 21, 1959 |
| 2,924,993 | White | Feb. 16, 1960 |
| 2,924,994 | Adee | Feb. 16, 1960 |
| 2,996,934 | White | Aug. 22, 1961 |